(12) United States Patent
Leines (10) Patent No.: US 10,689,924 B1
(45) Date of Patent: Jun. 23, 2020

(54) LIFT ASSIST FOR A TRUSS

(71) Applicant: CW10K40 LLC, Camden, DE (US)

(72) Inventor: Torsten Leines, Maple Grove, MN (US)

(73) Assignee: CW10K40 LLC, Paracorp Incorporated, Camden, DE (US)

( * ) Notice: Subject to any disclaimer, the term of this patent is extended or adjusted under 35 U.S.C. 154(b) by 0 days.

(21) Appl. No.: 16/263,553

(22) Filed: Jan. 31, 2019

(51) Int. Cl.
| | |
|---|---|
| *E21B 19/15* | (2006.01) |
| *B60P 1/64* | (2006.01) |
| *B62D 53/06* | (2006.01) |
| *B60P 3/40* | (2006.01) |
| *B62D 21/14* | (2006.01) |
| *B62D 63/06* | (2006.01) |

(52) U.S. Cl.
CPC .......... *E21B 19/155* (2013.01); *B60P 1/6445* (2013.01); *B62D 53/067* (2013.01); *B60P 1/6472* (2013.01); *B60P 3/40* (2013.01); *B62D 21/14* (2013.01); *B62D 63/06* (2013.01)

(58) Field of Classification Search
CPC .. B66F 7/08; B66F 7/065; B66F 11/00; B66F 7/0666; B66F 7/0691; B66F 11/042; B66F 3/22; B66F 3/46; E21B 19/155; E21B 19/14; E21B 19/15; E21B 19/20; B60P 1/16; B60R 5/04
USPC .... 254/122, 124, 126, 128, 8 B, 93 L, 93 R; 298/22
See application file for complete search history.

(56) References Cited

U.S. PATENT DOCUMENTS

| | | | | |
|---|---|---|---|---|
| 2,603,518 A | * | 7/1952 | Golay | B60P 1/20 298/22 B |
| 2,706,102 A | * | 4/1955 | Cresci | B60P 1/02 254/8 C |
| 4,114,854 A | * | 9/1978 | Clark | B66F 11/042 187/243 |
| 4,221,280 A | * | 9/1980 | Richards | B66F 7/065 187/269 |
| 4,373,701 A | * | 2/1983 | Kishi | B66F 11/042 187/243 |
| 4,890,692 A | * | 1/1990 | Oakman | B66F 3/22 182/141 |
| 6,561,589 B2 | * | 5/2003 | Jones | B60P 1/16 298/19 B |
| 6,877,942 B2 | * | 4/2005 | Eastcott | B60P 3/00 414/22.54 |

(Continued)

*Primary Examiner* — Gregory W Adams
(74) *Attorney, Agent, or Firm* — Dicke, Billig & Czaja, PLLC (57) ABSTRACT

Aspects of the disclosure relate to a trailer having a frame suitable for transporting an item, such as an oil drilling pipe. The trailer includes a boom which may be raised from the trailer and support cables used to move the pipe from the trailer to a storage or other location. The boom is raised and lowered by a hydraulic system comprising a primary cylinder and a secondary cylinder, each of which is attached to a lift assist assembly. The lift assist assembly provides greater leverage than would otherwise be available for the maximum size and weight of the load available for a given (fixed) maximum length of trailer. In this manner, the boom can be raised to greater heights, while maintaining horizontal distance, than otherwise. The lift assist assembly may be incorporated into an original manufacture or added in a retrofit application. Methods of use are also disclosed.

19 Claims, 11 Drawing Sheets

(56) References Cited

U.S. PATENT DOCUMENTS

| | | | | |
|---|---|---|---|---|
| 8,016,536 B2* | 9/2011 | Gerber | ............... | E21B 19/00 414/22.58 |
| 8,672,297 B2* | 3/2014 | Schmitt | ............... | B66F 7/08 254/122 |
| 8,899,901 B2* | 12/2014 | Hilton | ............... | E21B 19/14 414/22.54 |

* cited by examiner

LIFT ASSIST FOR A TRUSS

BACKGROUND

Drilling rigs are known and used for identifying geologic reservoirs of natural resources, such as oil, for example, and also to create holes that allow the extraction of natural resources from those reservoirs. The extraction process begins by positioning the drilling rig over the site to be drilled. Drilling rigs can be mobile and driven from site to site or can also be more permanent structures positioned over the drilling site.

The process begins by drilling a hole deep into the Earth. A long drill bit attached to a section of "drilling string" is used for this purpose. After each section is drilled, a steel pipe slightly smaller than the hole diameter is dropped in and often cement is used to fill the outer gap. The steel pipe is called a casing and provides structural integrity to the drilled hole. As the drill bit progresses deeper, additional sections of pipe need to be added to the drilling string to allow the drill bit to move further into the Earth. Typically, workers standing on the drilling rig take the additional sections of pipe, one by one, and screw them onto the drilling string, as needed. The additional sections of pipe are delivered to the site and then raised one by one to the workers with a crane. Currently, oil rigs are accessed by workers from the ground with a step ladder.

The present disclosure addresses problems and limitations with the related art.

SUMMARY

Aspects of the disclosure relate to a trailer having a frame for supporting and transporting a section of pipe or other item. The trailer includes a boom which may be raised from the trailer and used to move the pipe to or from the trailer to a storage or other location. For example, index arms may move the pipe from a ground storage rack to the boom, where a skate may push the pipe along the length of the boom toward the rig. Or, the pipe may be moved from the rig to the boom, where the skate allows controlled downward movement of the pipe to where the pipe may be moved from the boom back onto ground storage racks. The boom is raised and lowered in part a travel height truss (or "truss"), which in turn is assisted by a lift assist assembly. The lift assist assembly provides greater leverage than would otherwise be available for the maximum size and weight of the boom available for a given (fixed) maximum length of trailer. In some embodiments, the combination of the travel height truss and a lift assist assembly allows the boom to reach higher rig heights while maintaining a horizontal distance from the rig.

Embodiments of the disclosure are particularly useful for raising booms used to lift pipe sections used in oil drilling. In such embodiments, the frame can be driven to a job site, and the boom extended to its full height to enable movement of the pipe sections or other items up or down the boom. Embodiments of the disclosure provide a safe and stable, yet more versatile trailer because they permit the boom to raise the pipe sections to greater heights, while maintaining horizontal distance, than trailers without the inventive features.

In one aspect, the disclosure provides a trailer comprising a frame having opposing first and second sides as well as an axle supporting a plurality of wheels. The trailer includes a boom which may be raised from the trailer and used to move the pipe from the trailer to a storage or other location. The boom is raised and lowered by a hydraulic system comprising a primary cylinder and a secondary cylinder, each of which is attached to a lift assist assembly. The lift assist assembly provides greater leverage to the boom than would otherwise be available for the maximum size and weight of the boom available for a given (fixed) maximum length of trailer.

In another aspect, the disclosure provides a method of operating a trailer including providing a trailer in a transport arrangement, the trailer having a frame with first side and second sides as well as an axle supporting a plurality of wheels. In addition, the trailer includes a boom which may be raised from the trailer and used to move the pipe from the trailer to a storage or other location. The boom is raised and lowered by a hydraulic system comprising a primary cylinder and a secondary cylinder, each of which is attached to a lift assist assembly. The lift assist assembly provides greater leverage to the boom than would otherwise be available for the maximum size and weight of the boom available for a given (fixed) maximum length of trailer. In this way, the boom may raise the pipe sections to greater height than trailers without the inventive features.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. Like reference numerals designate corresponding similar parts.

DETAILED DESCRIPTION

In the following detailed description, reference is made to the accompanying drawings, which form a part hereof, and in which is shown by way of illustration specific embodiments in which the disclosure may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

One illustrative trailer 10 is collectively illustrated in the figures. As shown there, and particularly referring to FIGS. 1 and 2A-2C, the trailer 10 includes a hitch 12 for securing to a vehicle (not shown), such as a truck, as well as a frame 14 interconnected to the hitch 12. The frame 14 can take a variety of forms, as desired, and supports an item to be transported. In particular, the frame 14 preferably carries various loads omitted from FIGS. 1 and 2A-2C solely for clarity of illustration.

Figure 1:
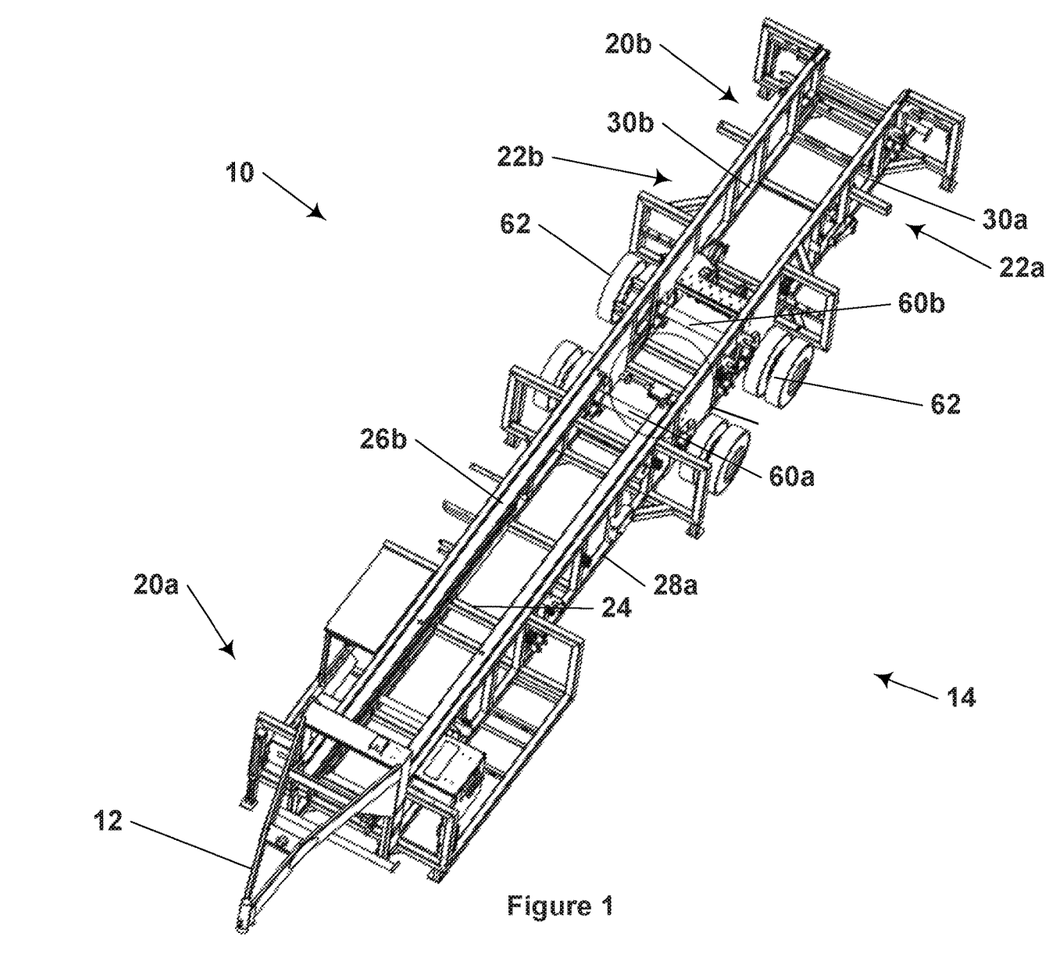
FIG. 1 is a perspective view of a frame portion of a trailer of the disclosure.
Figure 2A:
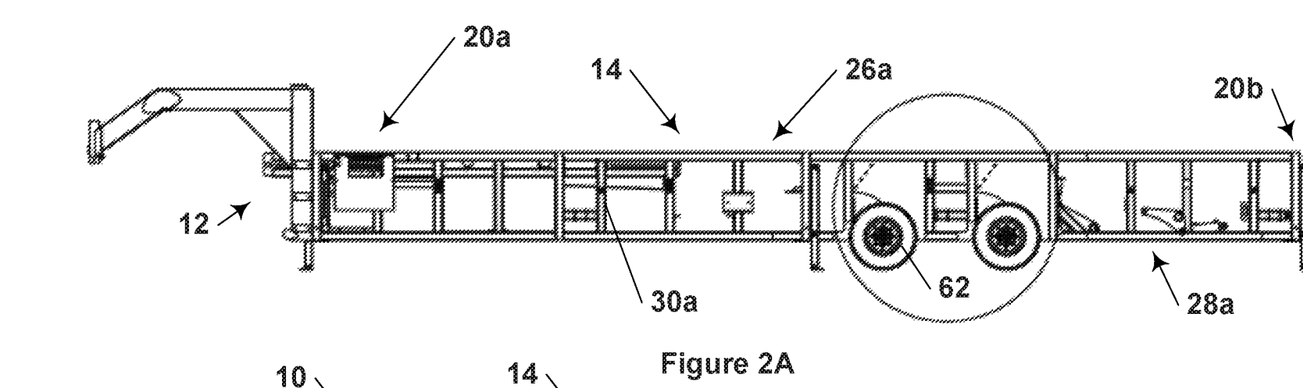
FIG. 2A is a side view of the trailer depicted in FIG. 1.
Figure 2B:
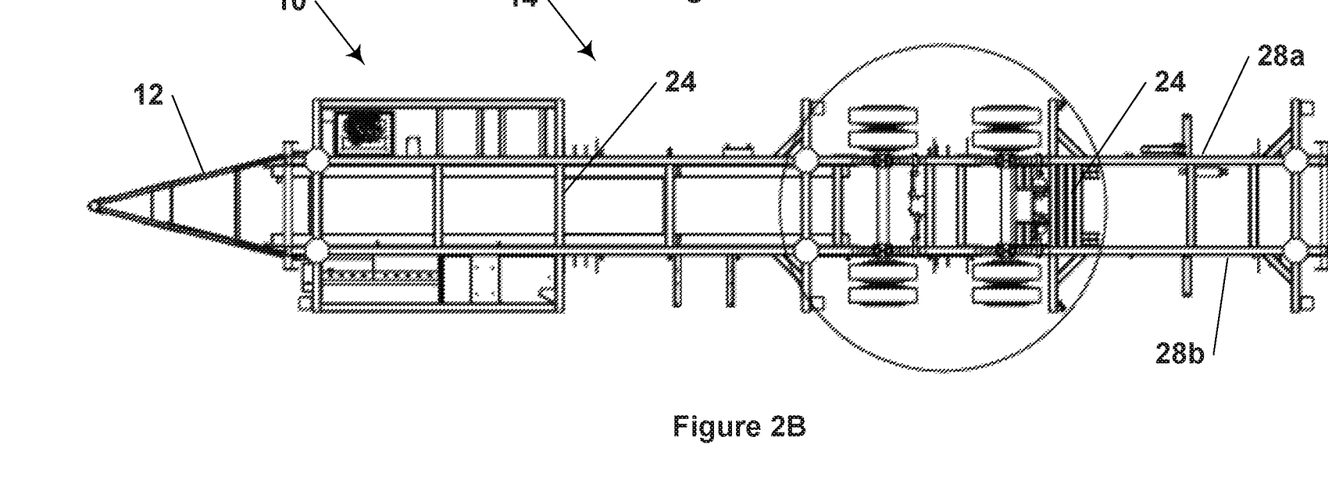
FIG. 2B is a bottom view of the frame portion of the trailer depicted in FIG. 1.
Figure 2C:
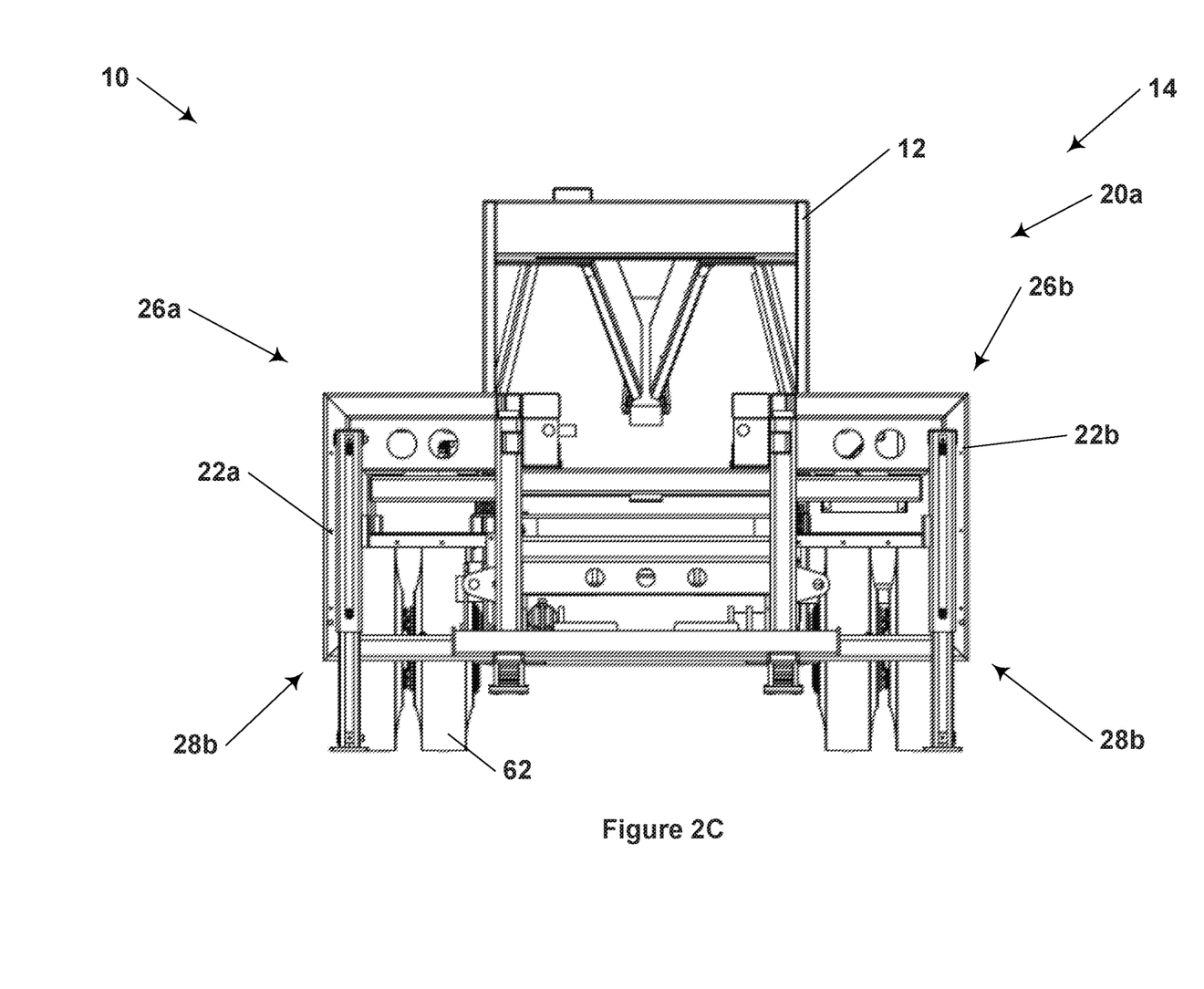
FIG. 2C is an end view of the frame portion of the trailer depicted in FIGS. 1 and 2A-2B.
Figure 3A:
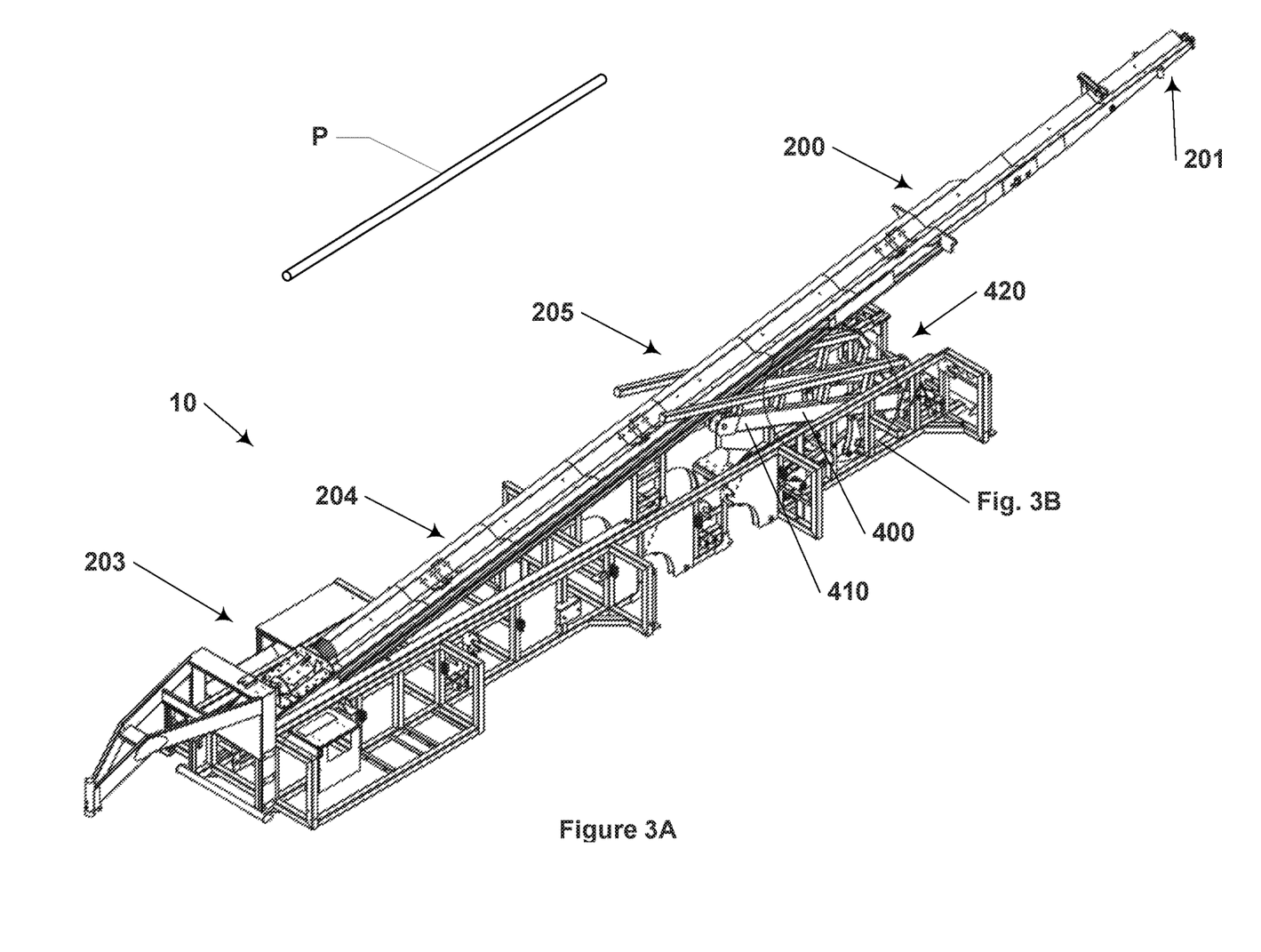
FIG. 3A is a perspective view of the frame of FIGS. 1 and 2A-2C loaded with additional components according to the disclosure.
Figure 3B:
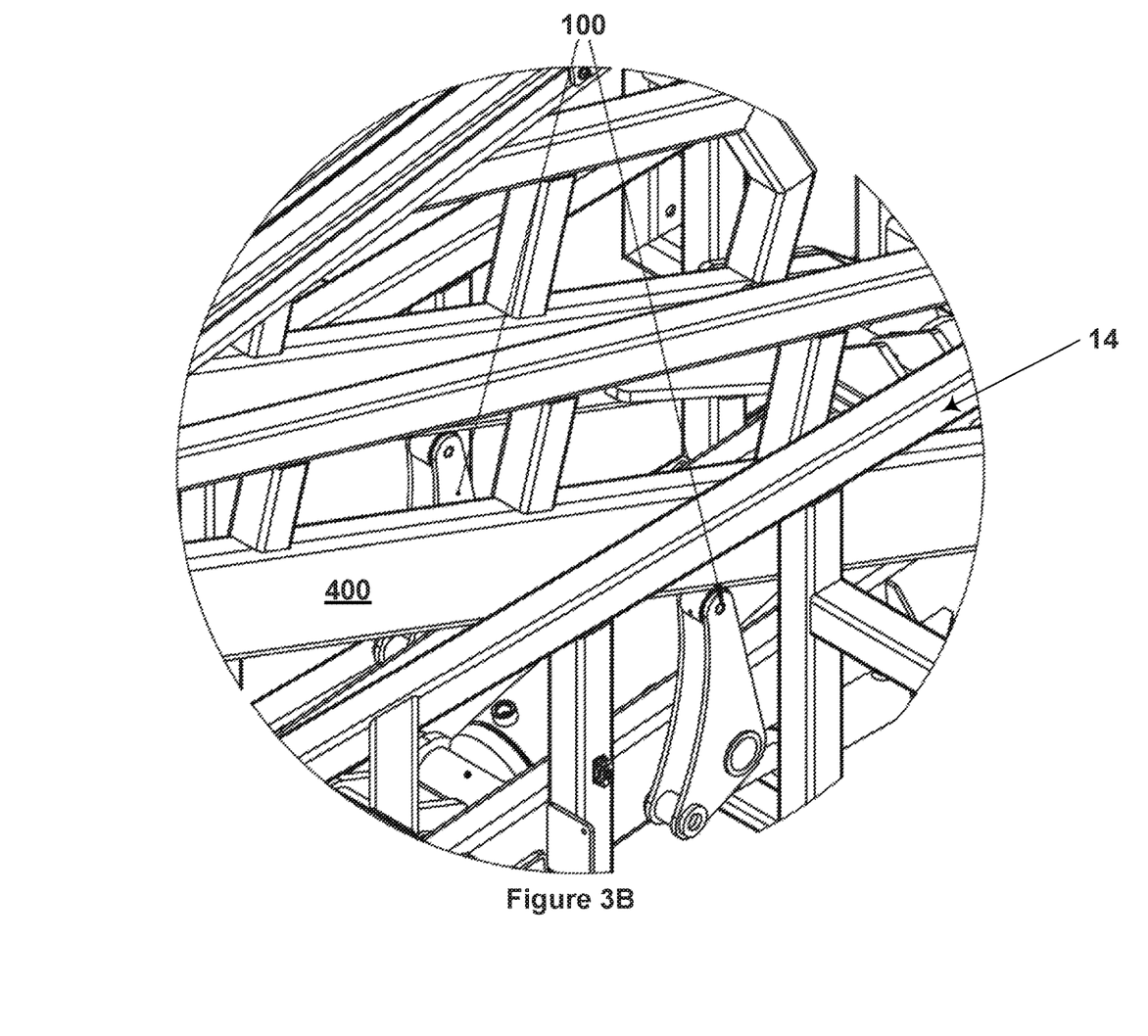
FIG. 3B is an enlarged view of a portion of FIG. 3A.

In one example, the item to be transported is a boom system usable to lift pipe sections P (FIG. 3A) suitable for oil drilling (e.g., pipe P in FIG. 3A). The frame 14 can, for example, include first and second ends 20a, 20b, first and second sides 22a, 22b, and multiple bottom supports 24 spanning the first and second sides 22a, 22b. Each side 22a, 22b can include a top 26a, 26b and a bottom 28a, 28b and include multiple vertical supports 30a, 30b spanning the respective top 26a, 26b and bottom 28a, 28b. It is noted that only a few representative horizontal supports 24 and vertical supports 30a, 30b are referenced for ease of illustration. The present disclosure, however, is not intended to be limited to any particular configuration of frame 14.

Interconnected to the frame 14 is at least one axle 60a, 60b operatively supporting at least one wheel 62 on opposing sides 22a, 22b of the frame 14 (e.g., four wheels connected to each axle, two on each side of the frame). The wheels 62 can be any type commonly used for trailers, trucks or the like. In the illustrated embodiment, the trailer 10 includes first and second axles 60a, 60b, each axle 60a, 60b supporting two wheels 62 on opposite sides 22a, 22b of the frame 14.

Turning now to FIGS. 3A-3F and 4A-4B, trailer 10 has a frame 14 which supports a boom 200. Generally, boom 200 is telescopically or otherwise extendable to a length longer than that of the length of the frame 14, but this is not required. Such extension may be accomplished by any convenient means not critical to this disclosure. Further details of one embodiment of the extendable boom may be found in application Ser. No. 16/263,592 filed Jan. 31, 2019, copending, the disclosure of which is hereby incorporated by reference in its entirety.

In general, the boom 200 is mounted to frame 14 so that a first portion 201 of the boom 200 may be elevated substantially above trailer 10 and frame 14 while a second portion 202 remains generally in place vertically. To increase the angle above vertical which boom 200 may make with the generally horizontal plane of the frame 14, and thus increase the height to which the first portion 201 may reach for a given length of boom 200, the second portion 202 both pivots about an axis transverse to the length of frame 14, and translates from a forward position 203 to a rearward position 204.

Boom 200 is elevated from frame 14 by the action of travel height truss 400 or "truss". Like boom 200 itself, travel height truss 400 is mounted to frame 14 so that one end of it may pivot above frame 14. Thus, the forward portion 410 of travel height truss 400 may be elevated substantially above the frame 14 while the rearward portion 420 remains generally in place vertically. The forward portion 410 is pivotably attached to boom 200 at a boom middle location 205. The angle above vertical which boom 200 makes with the generally horizontal plane of the frame 14 increases as the forward portion 410 of travel height truss 400 is elevated above frame 14. The elevation of forward portion 410 is accomplished by one or more hydraulic cylinders arranged to cause travel height truss 400 to move relative to frame 14.

Figure 4A:
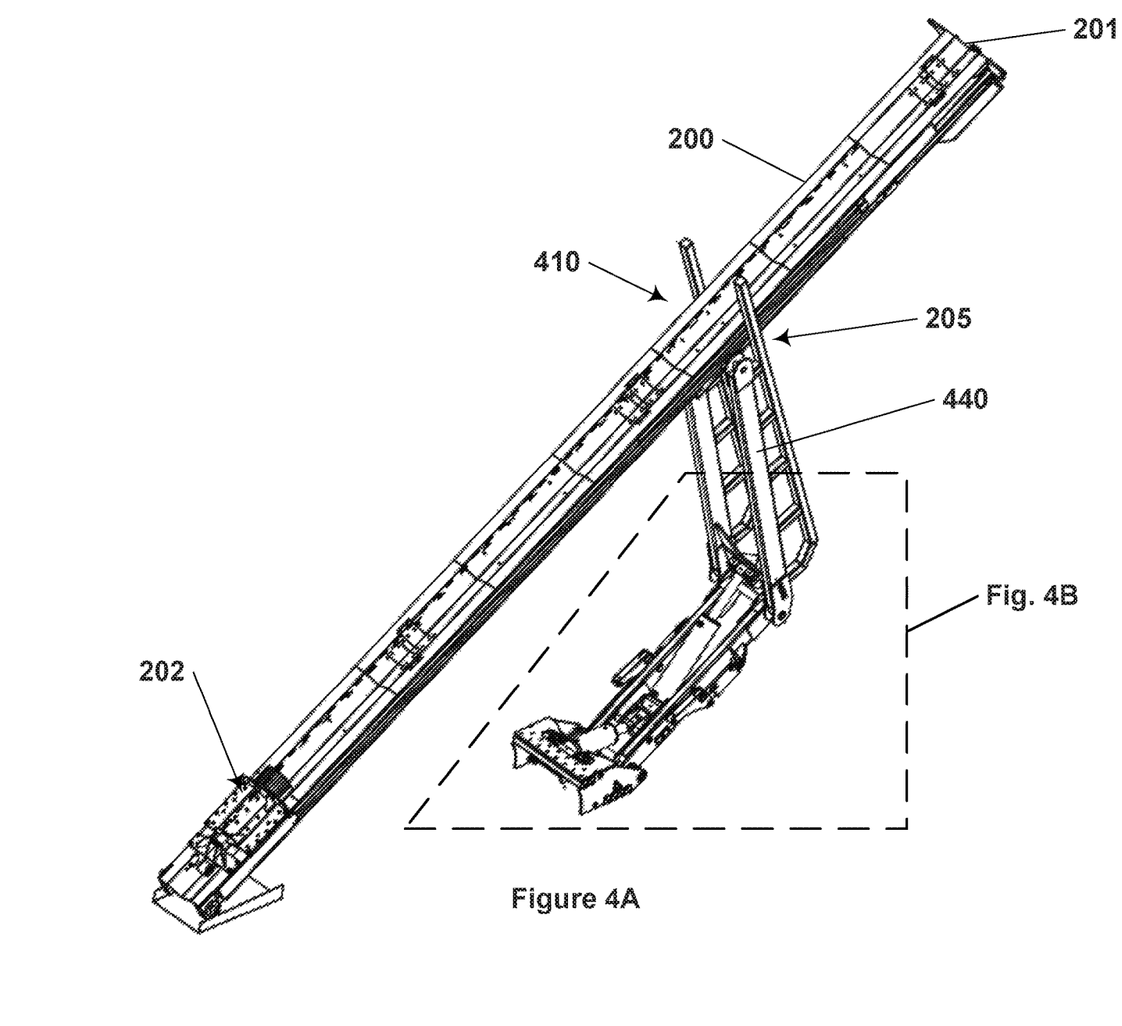
FIG. 4A is another perspective view of a portion of a loaded trailer according to the disclosure.
Figure 4B:
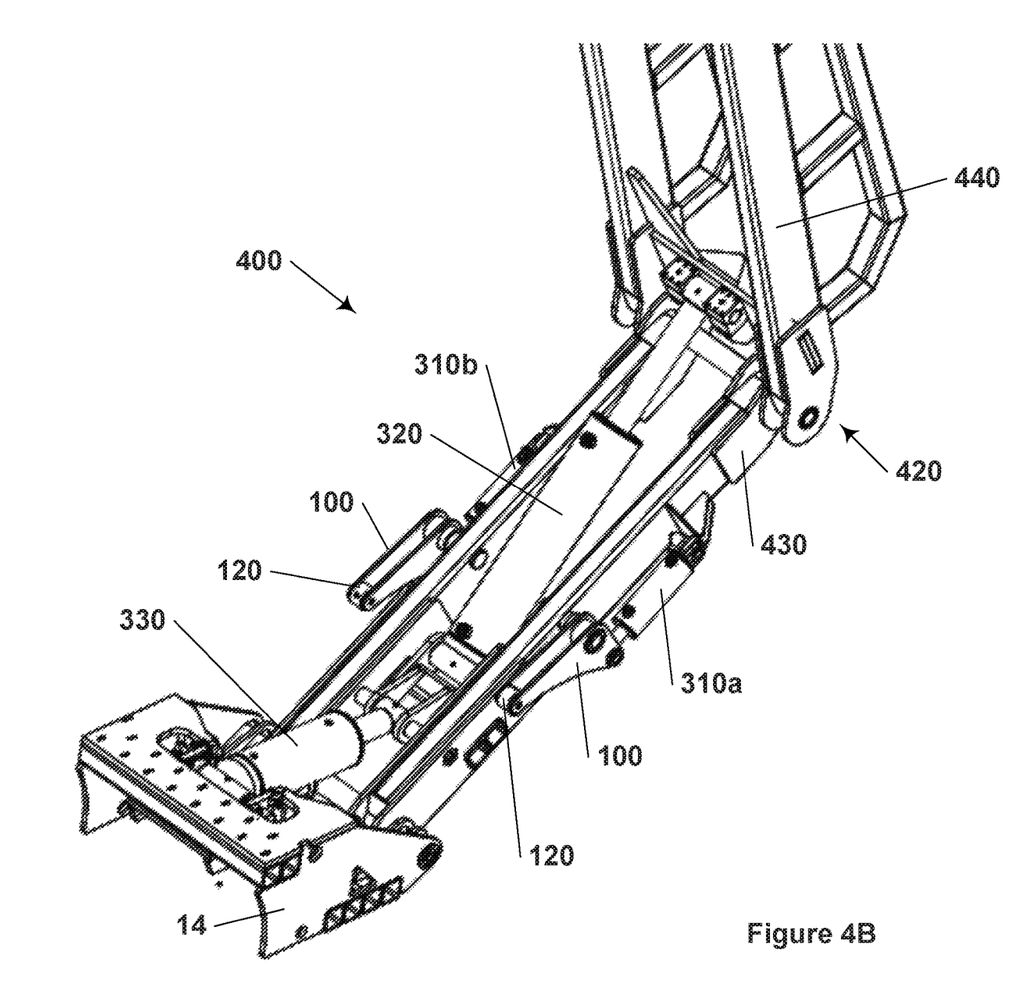
FIG. 4B is an enlarged perspective view of the portion of FIG. 4A within dashed lines.

As specifically illustrated in FIGS. 4A and 4B for purposes of illustration only, travel height truss 400 preferably comprises two portions 430, 440 pivotably attached to each other, and two hydraulic cylinders 320, 330. Each lift assist assembly 100 is mounted to inner portion 430 and each roller 120 of those assemblies contacts outer portion 440. The lift cylinder 320 is pivotably connected between lugs on each of the inner and outer portions 430, 440 and the travel cylinder 330 is pivotably connected to a lug on inner portion 430 and frame 14. With respect to lift assist assembly 100 and its operation, this configuration of travel height truss 400 is preferred but not required. Further details may be found in application Ser. No. 16/263,631 filed Jan. 31, 2019, copending, the disclosure of which is hereby incorporated by reference in its entirety.

In one preferred embodiment frame 14 is provided with a pair of lift assist assemblies 100, one such assembly on each opposing side 22a, 22b of the frame 14. The depiction of two lift assist assemblies 100 in the figures is a preference and not a requirement. In another embodiment according to this disclosure but not illustrated here, any number of lift assist assemblies could be employed provided the travel height truss were appropriately modified to accommodate each lift assist assembly.

In general terms, each lift assist assembly 100 transfers force created along a generally longitudinal direction by one of a pair of hydraulic cylinders 310a, 310b each of which is coupled to its respective lift assist assembly 100. Each lift assist assembly 100 transfers the force to the vertical load of the travel height truss 400, lifting the forward portion 410 of the travel height truss 400 as the rearward portion 420 pivots in place relative to frame 14. A roller 120 or other mechanism couples each lift assist assembly 100 to the travel height truss 400 in a manner that allows the point of contact to translate along the length of travel height truss 400 while maintaining application of the vertically directed force to travel height truss 400 as it rises above frame 14. The forward portion 410 thus rises above the frame 14, as illustrated in FIGS. 3A and 3F. In particular, the travel height truss 400 is preferably raised above the point at which its lower surface lifts away from each lift assist assembly 100 (that is, it lifts off of each roller 120). But when the process is reversed and travel height truss 400 is lowered, it is desirable for each lift assist assembly 100 to be in this "fully raised" position as illustrated in FIGS. 3D and 3F. This allows each lift assist assembly 100 to share the load, and contribute to the controlled lowering, of travel height truss 400. That is, to lower the boom 200, the process is reversed and the hydraulic cylinder causes each lift assist assembly 100 to rotate clockwise and thus lower the travel height truss 400. In this process, each lift assist assembly 100 is initially not engaged with the bottom of the travel height truss 400, as noted above, but is subsequently engaged and therefore acts as a safety damper in at least two ways. First, by absorbing a portion of the load it carries, namely the weight of the combination of the boom and travel height truss. Second, by slowing the rate at which the boom is lowered.

Figure 3C:
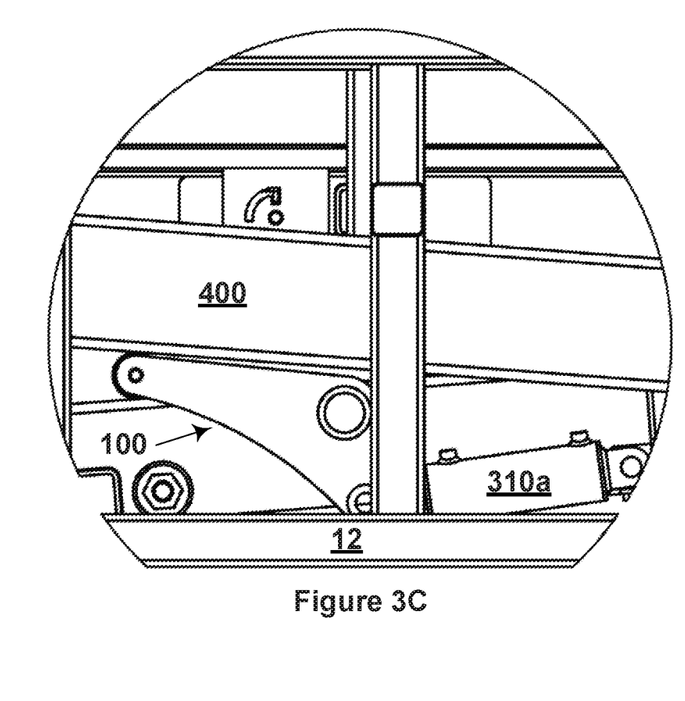
FIGS. 3C and 3D are enlarged views of the portion of FIG. 3B shown in alternative positions according to the disclosure.
Figure 3D:
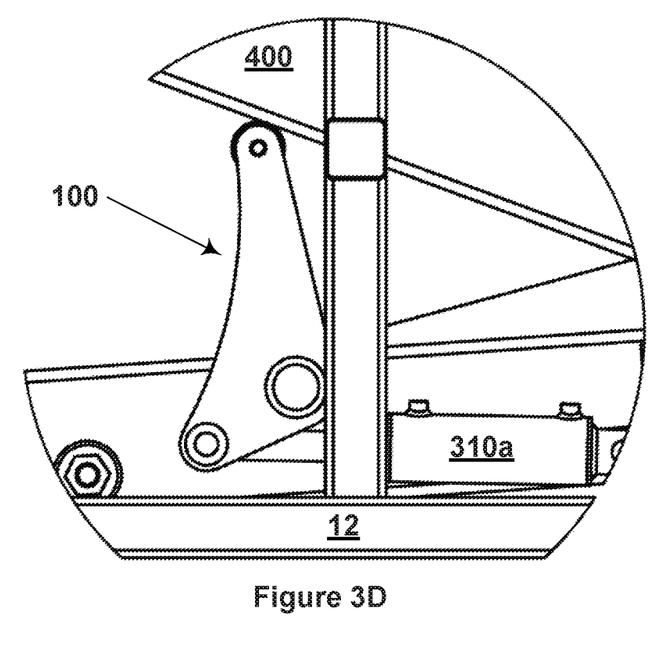
Figure 3E:
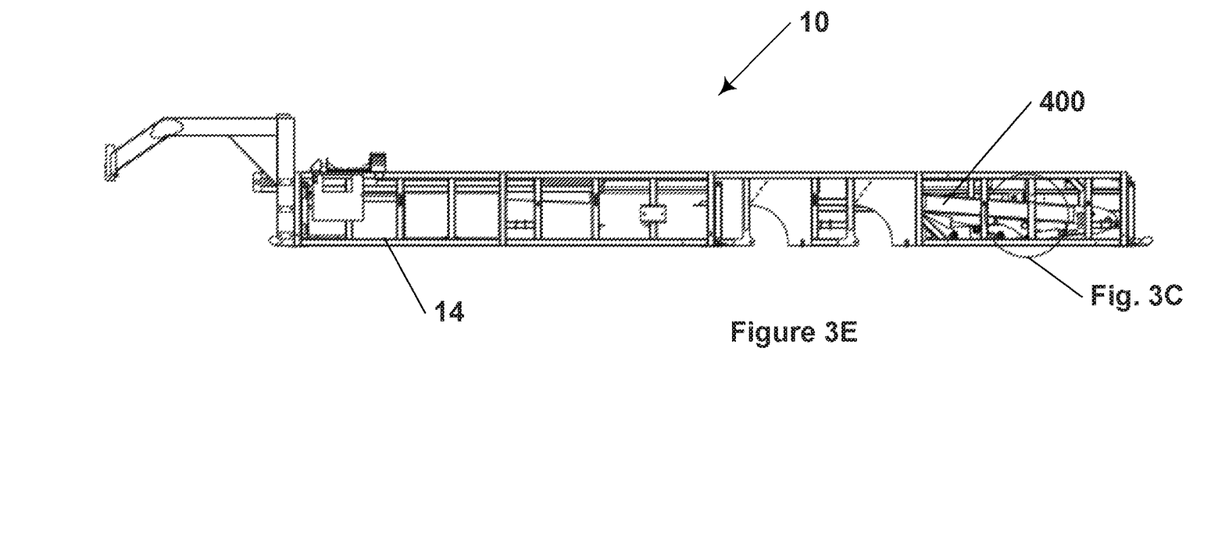
FIGS. 3E and 3F are side views of an entire trailer according to the disclosure corresponding to the alternative positions illustrated in FIGS. 3C and 3D, respectively.
Figure 3F:
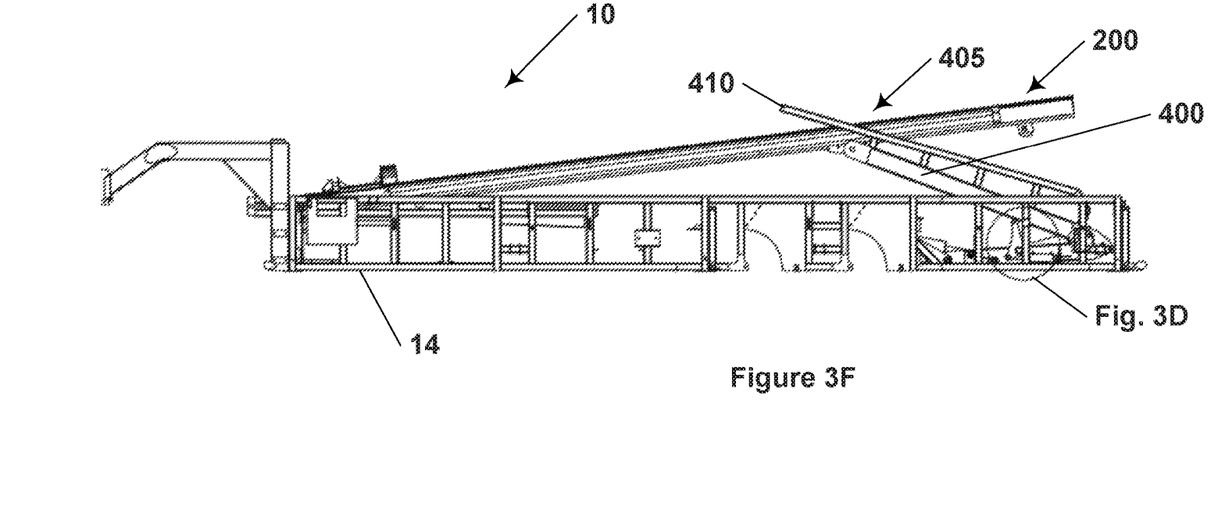

Specifically, when the boom 200 is lowered down to a position resting on the frame 14, the lift assist assembly 100 is oriented generally as shown in FIGS. 3C and 3E, i.e., with its long leg generally parallel to the top of the trailer. The travel height truss 400 is also generally parallel to the top of the trailer and lies on the roller 120. To raise the boom from this position, the hydraulic cylinders 310a, 310b each extend to apply force to each first pivot location 106 and thus each lift assist assembly 100 pivots about its B-B axis (FIG. 5A) to a position as shown in FIGS. 3D and 3F. In this position, each long leg is generally perpendicular to the top of the trailer. The other lift assist assembly 100, which is on the opposite side of trailer 10 and is not shown in FIGS. 3C-3E, pivots counterclockwise when the boom 200 is raised but otherwise moves in a like manner. The movement of the lift assist assembly 100 thus acts to lift the forward portion 410 of the travel height truss 400 above the rearward end of that truss. The roller 120 decreases friction between the lift assist assembly 100 and the bottom surface of the travel height truss 400 as the roller travels along the bottom of the truss.

The vertical force applied to travel height truss 400 by each lift assist assembly 100 is separate from and in addition to other force on the travel height truss created by any separate hydraulic system acting directly on travel height truss 400. While a single system may coordinate the operation of the lift assist assembly through the operation of the lift cylinder valve, in general these may be separately acting hydraulic systems which are coordinated with each other so as to act together. Thus, in some embodiments, the travel height truss 400 may have its own hydraulic cylinders 320a, 320b and controls for raising it above the point at which its lower surface lifts away from the roller 120. If so, the lift assist assembly 100 may be kept in its "fully raised" position so that it may contribute to the controlled lowering of travel height truss 400. It may then be returned to its "fully lowered" position in which it returns to its original configuration relative to the hinged travel height truss 400. It may then be returned to its "fully raised" position as part of the sequence of lowering the travel height truss 400. However, such a sequence is not required. The configuration of FIG. 4A is preferred when, as illustrated, each lift assist assembly 100 and its associated hydraulic cylinder 310a, 310b is mounted to a lower portion of travel height truss 400 itself, as opposed to frame 14.

Figure 5A:
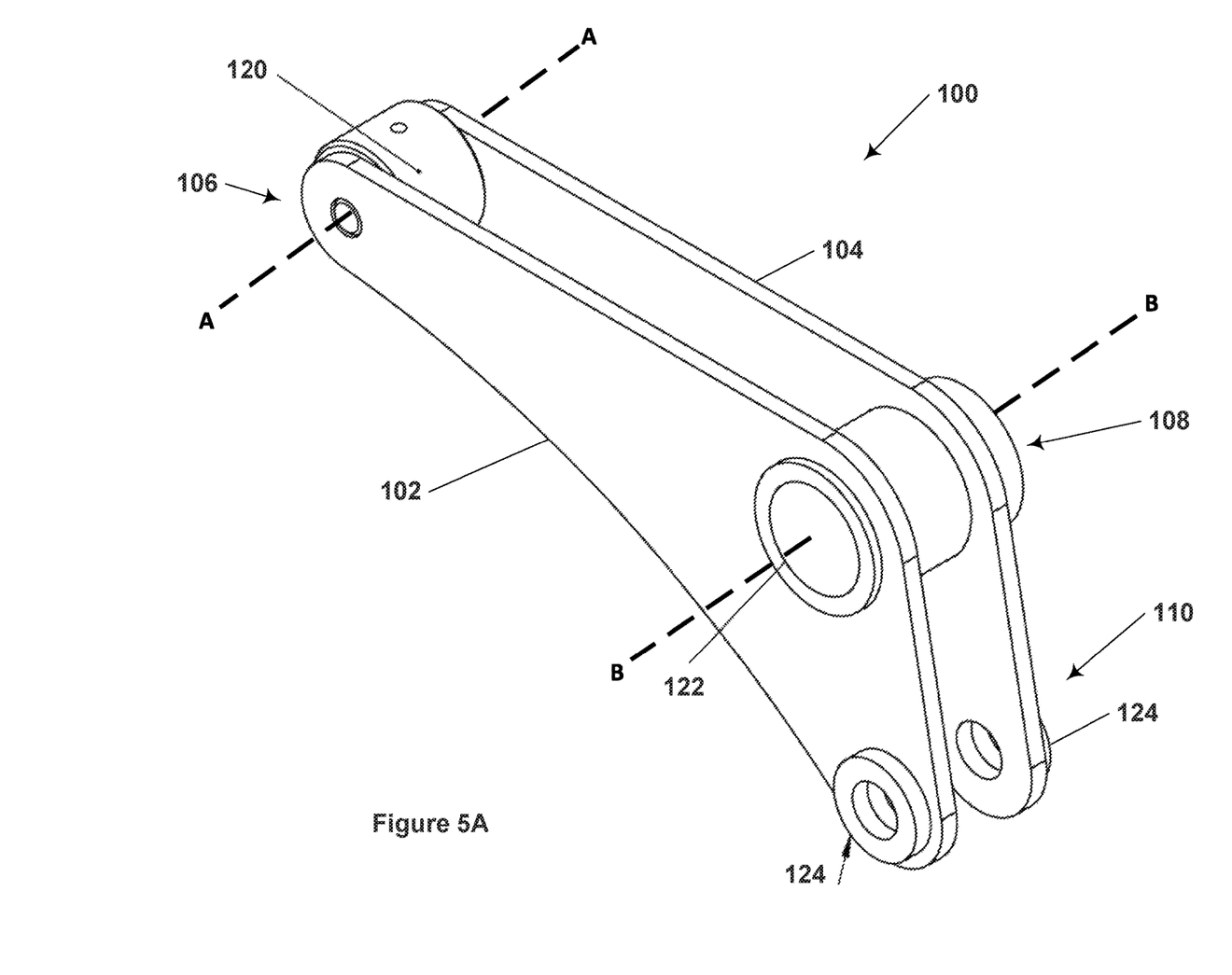
FIGS. 5A, 5B, and 5C are, respectively, perspective, side, and end views of a preferred embodiment of a component depicted in other figures. The dimensions and angles shown on FIGS. 5B and 5C are not in any manner limitations on the scope of the embodiments illustrated these or any of the other figures, or as discussed in this disclosure.
Figures 5B, 5C:
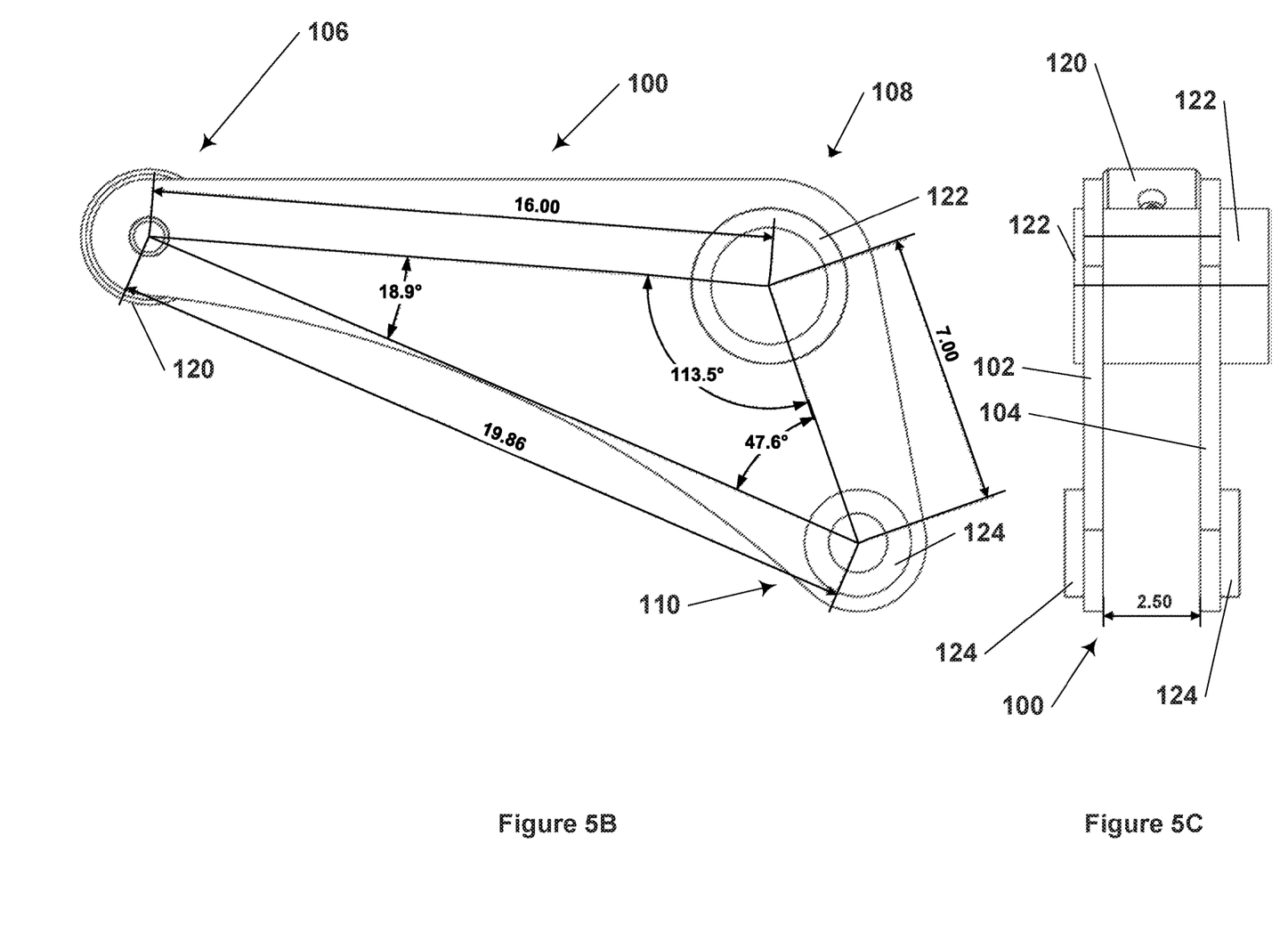

Turning to FIGS. 5A-5C, one preferred embodiment of a lift assist assembly 100 comprises two generally triangularly shaped plates 102, 104 which are preferably mirror images of each other, although in general that is not required. Preferably, the two plates, regardless of shape, are parallel to each other.

In the preferred embodiment illustrated, the two plates 102, 104 are joined to each other at three pivot locations generally indicated as 106, 108, and 110. The locations 106, 108, and 110 may be considered as the vertices of a triangle, and that triangle is generally similar to the generally triangular shape of each plate 102, 104 in the preferred embodiment. In embodiments not illustrated here, the plates may be joined to each other in additional locations and/or may be different shapes without necessarily changing the generally triangular relationship created by the locations of the three pivot locations. The following discussion relies on the preferred embodiment for context only and should not be understood as limiting the scope of the disclosure except where specifically noted.

The first pivot location 106 includes a roller 120 which is mounted to each of the plates 102, 104 in a conventional manner, such as by welding the ends of a shaft or opposing mounting plates (not shown) of a pre-assembled roller unit to each plate. Roller 120 is free to rotate completely about the axis denoted as A-A which is perpendicular to the plates 102, 104. Thus, the exposed outer surface of roller 120 may travel along the lower surface of other components of the trailer 10 (notably travel height truss 400) as the boom 200 is raised and lowered, as described above.

Roller 120 is located generally where the longer of the two legs of each triangle meets the hypotenuse of the triangle. Roller 120 decreases friction and thus allows application of a higher amount of force from a hydraulic cylinder 310a to the travel height truss 400.

The second pivot location 108 is located generally where the two legs of the triangle meet opposite of the hypotenuse. Pivot location 108 preferably comprises a bushing 122 or other feature to reduce friction such that the lift assist assembly 100 as a whole may pivot more readily around a travel height truss shaft 130 (not illustrated) which passes through bushing 122. Travel height truss shaft 130 lies along the axis denoted as B-B which is perpendicular to the plates 102, 104.

The third pivot location 110 is located generally where the shorter leg of the triangle meets the hypotenuse. Third pivot location 110 comprises a pair of half-sleeves (or clevis style sleeves) 124 or similar conventional coupling to permit a hydraulic cylinder 310a or 310b to be attached to the lift assist assembly 100. Thus, travel of the shaft of the hydraulic cylinder causes lift assist assembly 100 to pivot about axis B-B and move the location of roller 120 along the arc of a circle centered on axis B-B while roller 120 rotates about axis A-A. In this manner, lift assist assembly 100 is a lever which transfers generally longitudinal force from the hydraulic cylinder (310a, 310b) acting on the third pivot location 110 to the vertical load carried by the roller 120 at first pivot location 106.

The dimensions and angles shown on FIGS. 5B and 5C are not in any manner limitations on the scope of the embodiments illustrated and discussed in this disclosure. They are merely examples intended to illustrate some of the principles of the disclosure.

The description above describes the operation of each lift assist assembly 100 which was assumed to be manufactured as part of the original manufacture of trailer 10 and its associated loads and controls as described. However, a lift assist assembly 100 according to the principles of the disclosure may be retrofitted onto previously manufactured equipment, such as the addition of boom 200 and/or travel height truss 400 to a previously manufactured trailer 10.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A trailer comprising:
a frame;
a boom pivotally connected to the frame;
a truss positioned on the frame and supporting the boom; and a lift assist assembly configured to raise and lower the truss via force applied from a hydraulic cylinder coupled to the lift assist assembly, the lift assist assembly including:
  a first plate and a second plate aligned parallel to the first plate; wherein the first and second plates are joined at first, second and third pivot locations; the first pivot location including a roller, the second pivot location comprises a sleeve and the third pivot location includes a coupling that permits the hydraulic cylinder to be coupled to the lift assist assembly; further wherein travel of a shaft of the hydraulic cylinder will cause the lift assist assembly to move the location of the roller along an arc of a circle centered on an axis of the sleeve.

2. The trailer of claim 1, wherein the truss includes a forward portion pivotally connected to a rearward portion.

3. The trailer of claim 2, wherein the roller may travel along the truss.

4. The trailer of claim 2, wherein the lift assist assembly is secured to the truss.

5. The trailer of claim 2, wherein the truss includes a shaft and the lift assist assembly can pivot as a whole about the truss shaft, which lies along an axis perpendicular to the first and second plates.

6. The trailer of claim 1, wherein the lift assist assembly can be pivotally raised and lowered with respect to the frame.

7. The trailer of claim 1, wherein the lift assist assembly directly transfers the force to the truss to lift the truss.

8. The trailer of claim 7, the truss including a forward portion and a rearward portion; wherein the forward portion can be lifted above the frame as the rearward portion pivots in place relative to the frame.

9. The trailer of claim 1, further comprising a plurality of lift assist assemblies.

10. The trailer of claim 1, wherein the first plate and the second plate are triangularly shaped defining two legs and a hypotenuse.

11. The trailer of claim 10, wherein the roller is located where a longer of the two legs meets the hypotenuse.

12. A method of operating a trailer comprising:
providing a trailer having:
  a frame,
  a boom pivotally connected to the frame,
  a truss secured to the frame and supporting the boom, and
  a lift assist assembly configured to raise and lower the boom via force applied from a hydraulic cylinder coupled to the lift assist assembly,
the lift assist assembly including:
  a first plate and a second plate aligned parallel to the first plate; wherein the first and second plates are joined at first, second and third pivot locations; the first pivot location including a roller, the second pivot location comprises a sleeve and the third pivot location includes a coupling that permits the hydraulic cylinder to be attached to the lift assist assembly; and
moving a shaft of the hydraulic cylinder such that the lift assist assembly moves the location of the roller along an arc of a circle centered on an axis of the sleeve to raise the lift assist assembly into a raised position and to raise the boom.

13. The method of claim 12, further comprising the step of rotating the lift assist assembly to a lowered position when the boom is raised with respect to the frame.

14. The method of claim 13, further comprising the step of rotating the lift assist assembly to the raised position to support the boom as the boom is lowered with respect to the frame.

15. The method of claim 13, wherein the roller travels along the truss as the lift assist assembly transitions from the lowered position to the raised position.

16. The method of claim 12, wherein the truss includes a forward portion pivotally connected to a rearward portion.

17. The method of claim 12, wherein the boom is used for lifting an oil drilling pipe.

18. The method of claim 12, wherein the trailer is provided with a plurality of lift assist assemblies.

19. The method of claim 12, wherein the first plate and the second plate are triangularly shaped defining two legs and a hypotenuse.

* * * * *